2,839,413

Patented June 17, 1958

2,839,413

REFRACTORY BODY CONTAINING BORON NITRIDE

Kenneth M. Taylor, Lewiston, N. Y., assignor to The Carborundum Company, Niagara Falls, N. Y., a corporation of Delaware No Drawing. Application March 12, 1956
Serial No. 570,667

20 Claims. (Cl. 106—44)

This invention relates to bonded boron nitride bodies and to compositions and methods of making said bodies.

This application is a continuation-in-part application of my application Serial No. 288,551 filed May 17, 1952, now abandoned.

There is a constant search for new compositions or bodies which will possess unexpected combinations of properties essential to or generally found to be desirable in specific fields of use. The bonded boron nitride bodies of the present invention in which boron nitride is bonded by a secondary nitride possess certain combinations of properties and characteristics which render them of considerable value, and they offer outstanding possibilities in a number of fields of use. It is, therefore, to be understood that the bonded boron nitride bodies hereinafter more fully described are not to be considered as restricted to any particular field of use. However, their outstanding characteristics as a refractory material are particularly worthy of note and make them especially suitable for a number of refractory purposes. The present invention will therefore be primarily described in respect to the use of the herein described products for refractory purposes, although not intended to be limited thereto.

Above all, a refractory body must possess refractoriness, that is, an ability to stand up under exposure to high temperatures without undue chemical or physical change. Other desirable characteristics sought in a refractory body or shape include an ability to resist sudden changes in temperature without cracking or other manifestations of body breakdown, a relatively high mechanical strength at elevated temperatures as well as at room temperature, chemical inertness and resistance to various corrosive and erosive substances and conditions, a resistance to oxidative influences, and a density and hardness dependent upon the use to which the refractory body is to be put.

In order to obtain a high degree of perfection in respect of one or more of the above properties peculiarly desirable for the specific purpose in mind it has usually been found necessary to forego the benefits of maximum performance in respect of certain other desirable properties. Consequently, various refractory compositions exceptionally suitable for one field of use are often found to be entirely unsatisfactory for other purposes. There is, therefore, a continual demand for refractory bodies of new composition which will meet those demands of a special nature which require a combination of properties not to be found in those compositions of a refractory type already available. There is also a demand for refractory compositions which can be made readily without resort to exceedingly high temperatures.

It is an object of the present invention to provide bonded boron nitride bodies or shapes of unusual and distinctive compositions and properties.

It is another object of the present invention to provide refractory bodies or shapes having a particular combination of refractory properties heretofore unavailable in refractory compositions.

It is another object to provide compositions of matter and methods for making new and distinctive, bonded boron nitride bodies or shapes.

Other objects and advantages accruing from the present invention will become apparent as the description proceeds.

In accordance with the present invention bonded boron nitride shapes or bodies are formed by mixing boron nitride in granular or powdered form with finely divided silicon metal or finely divided aluminum metal, with or without the addition of a small amount of a temporary binder or plasticizer to provide green molded strength, compressing a mass of the material or forming an article of the desired shape by any of the well-known methods of formation such as pressure molding, tamping, slip casting, extrusion or the like, drying the formed article and firing it in an atmosphere of ammonia, nitrogen or other non-oxidizing atmosphere containing nitrogen at a temperature and for a period of time sufficient to convert the silicon or aluminum to silicon nitride or aluminum nitride. Granular or powdered silicon carbide may or may not be included in the mixture from which the article is made.

In order to efficiently convert the silicon or aluminum metal to silicon nitride or aluminum nitride the metal should be in the neighborhood of 200 mesh (U. S. Standard Sieve) size or finer. The silicon nitride or aluminum nitride which is formed in situ from the silicon or aluminum metal serves as a interstitial bond to strongly unite the boron nitride material to provide a body of satisfactory mechanical strength, the amount of silicon nitride or aluminium nitride in the final article being dependent upon the amount of silicon or aluminum metal used in the raw batch. The particular proportion of boron nitride to silicon or aluminum will depend upon the particular type of article desired and the purpose for which the resulting product is intended. When bodies are to be made consisting predominantly of aluminum nitride with a lesser amount of boron nitride, it is preferred to form the body by a slight modification of the same general procedure in which the boron nitride would be initially mixed and molded with part of the aluminum and nitrided, the resulting body crushed and mixed with the balance of the aluminum and molded and nitrided to provide a body having the desired amounts of boron nitride and aluminum nitride.

I have found that where silicon is used to provide a silicon nitride bond for the boron nitride, highly satisfactory results are to be obtained by using a commercial grade silicon ground to suitable fineness. Analysis of one commercial grade of silicon which I have satisfactorily used in carrying out the present invention discloses, in addition to the silicon, the presence of the following impurities:

| | Percent |
|---|---|
| Iron | 0.87 |
| Chromium | 0.21 |
| Aluminum | 0.60 |
| Calcium | 0.54 |

The boron nitride used in making the bonded boron nitride bodies or shapes of the present invention may be a commercial grade of boron nitride material available on the market. However, I prefer to use a boron nitride material made in accordance with the process described in my copending application Serial No. 288,553, filed May 17, 1952, issued October 1, 1957 as U. S. Patent No. 2,808,314. Briefly, that process may be described as comprising the preparation of a porous, pelleted mixture of boric acid or boric oxide and tricalcium phosphate, the pelleted mixture being heated in an atmosphere of ammonia in an electric muffle furnace or other suitable muffle furnace for several hours at around 900° C. whereby the boric oxide is converted to boron nitride, The resulting material is crushed and treated with dilute hydrochloric acid to dissolve the tricalcium phosphate and other extraneous material. The undissolved boron nitride after several washings with water is usually treated with hot 95% alcohol solution to further lower the content of oxidic material. Analysis of the resulting boron nitride is as follows:

|  | Percent |
|---|---|
| Boron | 41.45 |
| Nitrogen | 44.00 |
| Free boric acid (calculated as $H_3BO_3$) | .75 |
| Silica | .28 |
| Calcium | Trace |
| Phosphate ($PO_4$) | Trace |
| Material volatile at 110° C. | .26 |
| Extraneous matter | 13.26 |

The 13.26% of extraneous matter in the above table of analysis of the boron nitride product has not been fully identified as to character but insofar as it has been able to be determined it is considered to be for the most part oxygen which is either physically absorbed or united to the boron nitride in such a way that it is not alcohol-soluble as would be the case if it were present in the form of boric oxide. Although the material before being hot pressed into a shaped body does not contain any alcohol-soluble boric oxide, the shaped bodies resulting from hot pressing the material are found to contain a certain amount of free boric oxide. It is therefore concluded that a certain amount of a physically or chemically combined oxygen complex is contained in the original material, although X-ray analyses reveal the presence only of boron nitride. The analysis given above is therefore complete as far as it has been possible to positively identify the composition.

Bonded boron nitride bodies or shapes have been made in accordance with the present invention in the following manner. The boron nitride is mixed in the desired proportions with finely divided silicon metal or aluminum metal, depending upon whether a silicon nitride bond or an aluminum nitride bond is desired for the body. Granular or finely divided silicon carbide is included in the mixture, if desired. The mixture of boron nitride and silicon or aluminum, with or without the silicon carbide filler, and with or without a small amount of temporary binder to give added green strength, is moistened with water to a suitable molding consistency depending upon the particular manner of molding to be employed, and articles of the desired shape formed from the mixture. The thus formed articles are then dried and fired at a temperature of around 1400° C. in a nitrogen-containing, non-oxidizing, substantially non-carbonaceous atmosphere. The temperature can be raised somewhat above 1400° C. during the latter part of the nitriding operation after the nitriding reaction has progressed for some period of time to further assure completion of the nitriding action. Although commercial nitrogen gas is usually employed, ammonia gas or annealing hydrogen (containing 93% nitrogen and 7% hydrogen) can be used with satisfactory results. It is essential, however, that the nitrogen-containing gas be substantially non-oxidizing in character. It is also desirable where a silicon nitride bond is desired that the nitrogenous gas atmosphere be substantially free from materials which provide elements other than nitrogen which are reactive with the silicon or aluminum. Such materials include carbonaceous materials, such as carbon dioxide, carbon monoxide, hydrocarbons such as methane, or other constituents providing a source of elements such as oxygen or carbon which have a tendency to unite readily with silicon or aluminum. However, the presence of slight amounts of carbonaceous substances as impurities in the nitrogen-containing atmosphere can be tolerated and is not to be considered as a departure from the present invention.

In order that the invention may be clearly understood, the following examples are submitted as illustrative of the compositions for and manner of carrying out the present invention:

EXAMPLE I

Small nozzles 1¼ inches in length and ⅞ inch in outside diameter, bar-shaped compacts and other molded shapes and articles composed of boron nitride held together by a bond of silicon nitride have been made as follows. An intimate mixture was made of 5.1 parts by weight (85%) of finely divided boron nitride and .9 part by weight (15%) of finely divided silicon metal having a particle size of 200 mesh and finer. To the mixture of boron nitride and silicon metal was added 5% by weight of the total mass of "Carbowax" No. 4000 as a temporary binder and the resulting mixture molded into the desired shape at a pressure of from 5,000 to 30,000 pounds per square inch depending upon the particular shaped article being made. According to the "Hand Book of Material Trade Names" by Zimmerman and Lavine (published by Industrial Research Service, Dover, New Hampshire 1953) page 110, "Carbowax" is a group of non-volatile, solid polyethylene glycols, soluble in both water and aromatic hydrocarbons. They resemble natural waxes in appearance and texture, but are soluble in a much wider range of solvents. Their aqueous solutions possess binding properties. The same source of authority states that "Carbowax" No. 4000 is a hard, waxy solid having specific gravity of 1.2, freezing range of 50–55° C., a flash point greater than 475° F., and a Saybolt viscosity of 500–700 seconds at 210° F. The temporary binder was removed by heating the molded shape for a few hours at 300–400° C. The resulting shape was then fired in an atmosphere of nitrogen or ammonia at 1400° C. for a sufficient period of time to convert the silicon in the body to silicon nitride.

Table I below presents the fabricating data and also some of the physical properties of various bar-shaped compacts composed of mixtures of boron nitride and silicon fired in ammonia or nitrogen at 1400° C.

*Table I*

BAR SHAPED COMPACTS OF MIXTURES OF BORON NITRIDE AND SILICON FIRED IN AMMONIA OR NITROGEN AT 1,400° C.

| Experiment No. | Raw Mix Composition, percent by weight | Pressure used in forming, p.s.i. | Firing Conditions | Sandblast penetration [1] of fired body, inches | Apparent density of fired body, g./cc. |
|---|---|---|---|---|---|
| 1 | 85 BN; 15 Si | 30,000 | 8 hrs. in $NH_3$ | .011 | |
|   |              |        | 12 hrs. in $NH_3$ | .006 | |
|   |              |        | 28 hrs. in $NH_3$ | .003 | 1.72 |
| 2 | 80 BN; 20 Si | 30,000 | 16 hrs. in $NH_3$ | .006 | 1.63 |
| 3 | 80 BN; 20 Si | 30,000 | 8 hrs. in $N_2$ | .010 | 1.70 |
| 4 | 85 BN; 15 Si | 20,000 | 14 hrs. in $NH_3$ | .015 | 1.44 |
| 5 | 60 BN; 40 Si | 5,000  | 6–8 hrs. in $N_2$ | .047 | 1.63 |
| 6 | 50 BN; 50 Si | 6,000  | 6 hrs. in $N_2$ | .018 | 1.91 |
| 7 | 35 BN; 65 Si | 5,000  | 6–8 hrs. in $N_2$ | .028 | 1.84 |
| 8 | 10 BN; 90 Si | 5,000  | 6–8 hrs. in $N_2$ | .012 | 1.96 |

[1] Standard penetration on plate glass when subjected to the same penetration test is .010 of an inch.

The bar-shaped compacts set forth in Table I were 1½" in length x ½" wide x ¼" to ½" thick. 5% to 7½% "Carbowax" No. 4000 was used as a temporary binder. The compressive strength taken on test specimens in the form of ½" cubes cut from the resulting bars showed the bodies to have compressive strength at room temperature of from 5,500 pounds per square inch to a compressive strength as high as 15,000 to 16,000 pounds per square inch.

Similar ½" cubes were subjected to an oxidation test consisting of heating the cube in air for 24 hours at 1000° C. and the weight change determined. Such pieces as a result of the test showed a change in weight of around 2.5%.

The bars were also subjected to a heat shock resistance test which consisted of placing a specimen bar 1½" x ½" x ½" in size in a furnace at a temperature of 1850° F. until the temperature of the specimen reached furnace temperature. The test piece was then removed and cooled with a blast of air to a dark color. The heating and cooling was repeated through 25 cycles. Heating of the piece required about three minutes and cooling of the piece required about one minute. The bars remained sound and unaffected after exposure to 25 cycles of such a test.

One-half inch cubes of the same composition were subjected to a load test at 1200° C. and showed no slumping as a result of the test which consisted of heating the cube to 1200° C. (2192° F.) at a rate of 200° C. temperature rise per hour under a load of 60 pounds per square inch. The loaded specimens were held at 1200° C. for one hour and then gradually cooled to room temperature. Samples were then measured to determine the amount of slump. No slumping occurred on articles of the type made according to Example I and described in Table I.

The bond in the fired pieces such as those shown in Table I has been shown to be principally silicon nitride as verified by X-ray diffraction analyses.

Nozzles 1¼ inches long by ⅞ inch in diameter were made from the following compositions:

|  | No. 1, percent | No. 2, percent |
|---|---|---|
| Boron nitride | 83 | 65 |
| Silicon | 17 | 35 |

The above nozzles were formed from mixtures made similar to the procedure set forth for Example I above using 15% "Carbowax" No. 4000 as a temporary binder and pressing the nozzles at 8,000 pounds per square inch. The nozzles were fired in an atmosphere of nitrogen for two hours at 1350° C. and an additional eight hours at 1400° C. The fired nozzles had apparent densities as follows:

No. 1, 1.39 g./cc.; No. 2, 1.45 g./cc.

EXAMPLE II

Two bar shapes, 1½" x ½" x approximately .3" were formed by pressing mixtures of boron nitride and powdered aluminum at 30,000 pounds per square inch with 5% "Carbowax" No. 4000 as a temporary binder. Fabricating data and physical properties of the resulting bodies is set forth in Table II below:

Table II

DATA RELATIVE TO COMPACTS OF MIXTURES OF BORON NITRIDE AND POWDERED ALUMINUM FIRED IN AMMONIA OR NITROGEN

| Bar No. | Raw Mix Composition, percent by weight | Firing | Weight gain in firing, percent | Sandblast penetration [1] on fired bars, inches |
|---|---|---|---|---|
| 1 | 85 BN; 15 Al | 1½ hrs. in nitrogen at 1,000° C. | 3.9 | .097 |
|  |  | Same bar refired 10 hrs. in ammonia at 1,300° C. | 2.9 | .060 |
| 2 | 70 BN; 30 Al | 16 hrs. in ammonia at 1,400° C. | 12.0 | .018 |
| 3 | 60 BN; 40 Al | 6 hrs. in nitrogen at 1,400° C. |  | .007 |

[1] Standard penetration on plate glass is .010 of an inch.

The resulting bodies have been subjected to several months aging in air without deterioration. Although they were not as hard as the bodies made from comparable mixtures of boron nitride and silicon heated in ammonia they were of adequate mechanical strength for numerous uses.

Other proportions of aluminum to boron nitride can be used and the time and temperature of firing varied depending upon the properties desired in the product. Also the firing can be done in an atmosphere of nitrogen instead of in ammonia.

EXAMPLE III

A rocket nozzle 1¼" long and ⅞" in diameter composed of boron nitride and silicon carbide held together by a silicon nitride bond was made from the following mix:

| | Parts by weight |
|---|---|
| Boron nitride | 42.5 |
| Silicon carbide, 220 mesh | 32.5 |
| Silicon carbide, colloidal | 10.0 |
| Silicon, 200 mesh and finer | 15.0 |

To 24 grams of the above mixture there was added 2.4 grams of "Carbowax" No. 4000 dissolved in 4.8 cc. of benzene and the mixture ground in a mortar until the benzene had evaporated. The resulting mix was then formed into the rocket nozzle shape by pressing in a suitable mold at approximately 10,000 pounds per square inch. The temporary binder was removed by slowly heating to about 600° C. and the nozzle fired for 8 hours in ammonia gas at approximately 1400° C. In firing, the nozzle gained weight and increased in strength and hardness due to the conversion of the silicon to silicon nitride.

Nitrogen may be used in firing instead of ammonia and the proportions of ingredients may be varied over a considerable range. For example, by increasing the proportion of silicon and consequently the resulting silicon nitride in the final fired object, such as increasing the proportion of silicon in the original mix to 30%, an article having greater strength and hardness is obtained.

Among the advantages derived from a refractory body of the above type containing a large amount of boron nitride over a similar article composed entirely of silicon carbide bonded with silicon nitride is the greater lightness of the article.

While the various examples set forth above have recited specific percentages by weight of boron nitride, silicon nitride, silicon carbide and aluminum nitride in the bodies made, the present invention is not limited to any particular proportions of the named ingredients since the exact proportions of ingredients are not critical to the invention, it only being essential that sufficient silicon nitride and/or aluminum nitride be present to impart the required mechanical strength and hardness to the final article depending upon the ultimate use to which the article is to be put. As a matter of fact, the silicon nitride or aluminum nitride can amount to as low as around 8% by weight or as high as around 97% by weight of the body, which would require around 5% silicon and around 95% silicon, respectively, in the raw batches from which the articles were made. Also, any proportion of the boron nitride of the body can be replaced by granular silicon carbide as a filler, although the body should contain at least 5% by weight of boron nitride.

While I have described in the above examples the making of various molded shapes in which the article is molded from a mixture of boron nitride and the metal to be nitrided in the exact shape or form in which it is intended for use, the present invention is not intended to be so restricted. Another way of making and using bonded boron nitride bodies of the present invention is to mold the raw batch of material into briquettes or shapes or otherwise compress a mass of material having a composition of the desired proportions, after which the resulting briquette or compressed bodies are nitrided in the manner already described. After removal from the furnace they are crushed to granular form of the required grit size. The resulting granular material can then be used in loose granular form at high temperatures as an insulation material, as for example, insulation around rocket combustion chambers, or as a layer of insulation around industrial furnace chambers. It may also be used as a loose filtering media or as a catalyst carrier material. The granular material can also be bonded by means of sintered metals, vitreous or ceramic bonds, or other bonding materials to form articles suitable for many of the industrial uses set forth elsewhere herein.

Likewise, articles or bodies can be made according to the present invention in which pore-forming materials are incorporated in the raw batch from which the body is made for the purpose of providing a greater degree of porosity in the final body. Pore-forming material such as carbon or the like, which requires oxidation for removal from a body, would require a preliminary burning out of the pore-forming material at lower temperatures. Therefore, the pore-forming material preferably should be a material which is removed by volatilization during the drying and/or firing operation such as powdered or granular naphthalene, various organic resinous materials such as phenolic resins and the like or one which provides pores by reason of the generation of a gas. The resulting bodies, which have greater porosities than those made with no pore formers, are particularly useful in the fabrication of porous filtering media, catalyst and catalyst carriers, insulation bodies and the like, whether in crushed, granular form or in the form of molded shapes of predetermined contour.

It is to be understood that the products of the present invention in its various modifications are not limited to any specific field or fields of use such as might be defined by the specific examples previously set forth. The product can be made in any desired shape as well as provided in granular or aggregate form. They are, therefore, not only suited for many of the uses for which industrial refractories are required, including bricks, blocks, setter tile, muffles, kiln furniture, and special shapes for application in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, radomes for guided missiles, lens fusion blocks, spark plug bodies and the like. The bodies are also suitable for making crucibles and other laboratory ware or industrial structural articles or parts for the handling of corrosive chemicals such as molten cryolite or other fused halides. They are also suitable for the fabrication of laboratory ware including combustion boats, crucibles, burner holders and other shapes. The bodies of the present invention particularly when modified by the use of pore formers in the raw batch from which the bodies are made are also highly useful as diffusion and filtering media such as diffusion tubes and plates, filtering tubes, plates and shapes, or as catalyst or catalyst carriers and supports. Materials and articles of the present invention can also be used in making abrasive articles such as grinding wheels, sharpening stones, razor hones and other grinding and polishing shapes and materials. The present bodies offer possible applications in the electrical and radio industry including supports in electric light bulbs, radio tubes, X-ray tubes, radar equipment, resistors and grid leaks.

Having described the present invention it is desired to claim:

I claim:

1. A bonded boron nitride body consisting essentially of 3% to 92% by weight boron nitride and 97% to 8% of a silicon nitride bond.

2. As a new article of manufacture, a body of 3% to 92% by weight boron nitride and a bond consisting essentially of 97% to 8% silicon nitride.

3. As a new article of manufacture, a body of 3% to 92% by weight boron nitride and a bond consisting essentially of 97% to 8% aluminum nitride.

4. A refractory body consisting essentially of 3% to 92% by weight boron nitride and 97% to 8% by weight silicon nitride.

5. A refractory body consisting essentially of 3% to 92% by weight boron nitride and 97% to 8% by weight aluminum nitride.

6. A refractory body consisting essentially of 3% to 92% by weight boron nitride and 97% to 8% by weight of a nitride selected from the group consisting of silicon nitride and aluminum nitride.

7. A refractory body according to claim 6 also containing silicon carbide.

8. As a new article of manufacture, a body consisting essentially of boron nitride particles held together by 8% to 97% by weight of silicon nitride.

9. As a new article of manufacture, a body consisting essentially of boron nitride particles and silicon carbide particles held together by 8% to 97% by weight of silicon nitride.

10. A raw batch for the manufacture of bonded boron nitride bodies, said batch consisting essentially of 5% to 95% by weight of boron nitride, and finely divided silicon.

11. A raw batch for the manufacture of bonded boron nitride bodies, said batch consisting essentially of 5% to 95% by weight of boron nitride, and finely divided aluminum metal.

12. A raw batch for the manufacture of bonded boron nitride bodies, said batch consisting essentially of boron nitride, silicon carbide and 5% to 95% by weight of finely divided silicon.

13. A raw batch for the manufacture of bonded boron nitride bodies, said batch consisting essentially of boron nitride, silicon carbide and 5% to 95% by weight of finely divided aluminum metal.

14. A raw batch for the manufacture of bonded boron nitride bodies, said batch consisting essentially of boron nitride and 5% to 95% by weight of finely divided chemical element, said chemical element being selected from the group consisting of aluminum and silicon.

15. A method of making bonded boron nitride articles which comprises forming a mixture consisting essentially of boron nitride particles and 5% to 95% by weight of a finely divided chemical element selected from the group consisting of silicon and aluminum, molding an article from said mixture, and firing said article in a non-oxidizing, nitrogenous atmosphere at a temperature around 1400° C. to convert the chemical element to a nitride of said chemical element and thereby bond the boron nitride particles together.

16. A method of making bonded boron nitride articles which comprises forming a mixture consisting essentially of boron nitride particles and 5% to 95% by weight of a finely divided chemical element selected from the group consisting of silicon and aluminum, molding an article from said mixture, and firing said article in a non-oxidizing, nitrogenous atmosphere to a temperature of around 1400° C.

17. A method of making bonded boron nitride articles which comprises forming a mixture consisting essentially of boron nitride particles and 5% to 95% by weight of a finely divided chemical element selected from the group consisting of silicon and aluminum, molding an article from said mixture, and firing said article in an atmosphere of ammonia at a temperature around 1400° C. to convert the chemical element to a nitride of said chemical element and thereby bond the boron nitride particles together.

18. A method of making bonded boron nitride articles according to claim 15 in which a part of the boron nitride of the mixture is replaced by particles of silicon carbide.

19. A method of making bonded boron nitride articles of manufacture comprising forming an article of the desired shape from a mixture consisting essentially of 5% to 95% by weight of finely divided silcon and 95% to 5% by weight boron nitride, and firing the formed article at a temperature of 1400° C. in a non-oxidizing atmosphere containing nitrogen to convert the silicon to silicon nitride.

20. A method of making bonded boron nitride articles of manufacture comprising forming an article of the desired shape from a mixture consisting essentially of 5% to 95% by weight of finely divided aluminum metal and 95% to 5% by weight boron nitride, and firing the formed article at a temperature of 1400° C. in a non-oxidizing atmosphere containing nitrogen to convert the aluminum metal to aluminum nitride.

References Cited in the file of this patent

UNITED STATES PATENTS

| | | |
|---|---|---|
| 1,894,685 | Heidger | Jan. 17, 1933 |
| 2,108,794 | Boyer et al. | Feb. 22, 1938 |
| 2,109,246 | Boyer et al. | Feb. 22, 1938 |
| 2,609,318 | Swentzel | Sept. 2, 1952 |
| 2,636,826 | Nicholson | Apr. 28, 1953 |

FOREIGN PATENTS

| | | |
|---|---|---|
| 478,016 | Great Britain | Jan. 11, 1938 |